H. S. FAUGHT.
FISH BAIT OR LURE.
APPLICATION FILED JUNE 11, 1912.
1,069,093.
Patented July 29, 1913.
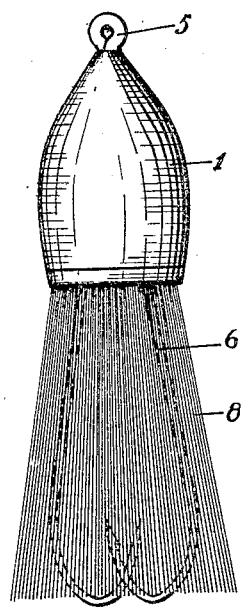
Fig. I.
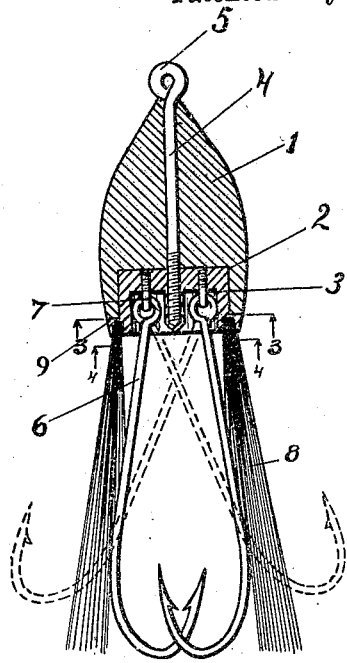
Fig. II.
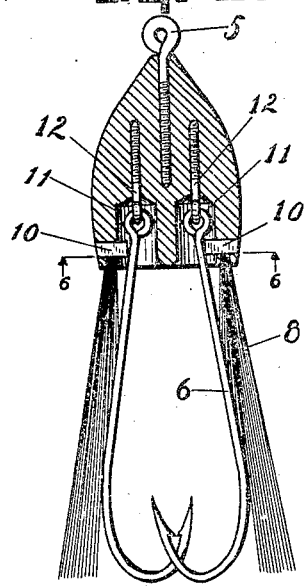
Fig. V.
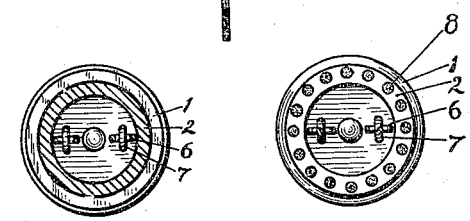
Fig. III. Fig. IV.
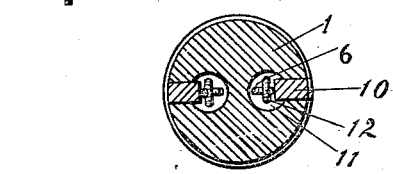
Fig. VI.
Witnesses
Anna Dootz
Margaret L. Glasgow
Inventor
Henry S. Faught
By Chappell & Earl
Attorneys

UNITED STATES PATENT OFFICE.

HENRY S. FAUGHT, OF KALAMAZOO, MICHIGAN.

FISH BAIT OR LURE.

1,069,093.  Specification of Letters Patent.  Patented July 29, 1913.

Application filed June 11, 1912. Serial No. 702,958.

*To all whom it may concern:*

Be it known that I, HENRY S. FAUGHT, a citizen of the United States, residing at the city of Kalamazoo, county of Kalamazoo, and State of Michigan, have invented certain new and useful Improvements in Fish Baits or Lures, of which the following is a specification.

This invention relates to improvements in fish baits or lures.

The main objects of this invention are,—First, to provide an improved weedless fish bait or lure of the buck tail or brush type. Second, to provide an improved fish bait or lure in which the tail or brush and the hook can be readily changed when desired. Third, to provide an improved fish bait or lure in which the hooks are so supported as to be effectively concealed and at the same time to effectively engage when struck by a fish. Fourth, to provide in a fish bait or lure, an improved hook attaching means.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side elevation of a structure embodying the features of my invention, the hooks being shown in a normal position by dotted lines. Fig. II is a central longitudinal section through the structure shown in Fig. I, the hooks being shown in their normal position by full lines, and in their extended position by dotted lines. Fig. III is a cross section taken on line 3—3 of Fig. I1. Fig. IV is a cross section taken on line 4—4 of Fig. II. Fig. V is a central longitudinal section corresponding to that of Fig. II of a modified construction. Fig. VI is a cross section taken on line 6—6 of Fig. V.

In the drawing similar reference characters refer to similar parts throughout the several views, and the sectional views are taken looking in the direction of the little arrows at the ends of the section lines.

Referring to the drawing, the body 1 which is ordinarily formed of wood, is cylindrical in cross section and tapered. The rear end of the body is bored out at 2 to receive the socket 3. This socket is secured in the body by means of the rod 4 which is provided with an eye 5 at its forward end for the attachment of the line, the rear end of the rod being threaded to engage the socket, as clearly shown in Fig. II. The socket is by this simple means, removably attached so that other sockets with different hooks or different forms of brushes or tails may be substituted therefor should it be desired.

The fish hooks 6 are secured in the bottom of the socket by means of screw eyes 7. The screw eyes 7 are disposed so that the rearward movement of the hooks is limited by their engagement with the edge of the socket.

The tufts 8 of the tail or brush are arranged in the edge of the socket, the socket being preferably flanged outwardly at 9, the flange overlapping the end of the body. The tail is formed of hair or feathers or other suitable material ordinarily used in forming "buck-tail" baits.

The hooks 6 are preferably magnetized to support them in their normal position concealed within the brush or tail.

In the modified construction shown in Fig. V, instead of magnetizing the hooks, I provide small magnets 10, one for each hook. The magnets 10 are arranged in the body so that the hooks rest against the same when in their normal position. In this modified construction, the separable socket 2 is omitted, and sockets 11 formed in the body by boring holes therein. The hooks are secured in the bottom of these sockets by means of the screw eyes 12. The tail tufts are, in this structure, secured directly in the end of the body and are grouped about the socket substantially the same as in the structure shown in Figs. I to IV. The structure shown in Figs. I to IV, however, has the advantage of permitting the changing of the sockets having different hooks and tails so that a variety of different hooks and tails may be provided for use on a single body. This is of advantage on account of the economy of space in the equipment and also the item of expense.

I have not attempted to illustrate or describe all the various modifications or embodiments of which my invention is capable and which I contemplate as the disclosures made will enable those skilled in the art to which this invention relates to adapt the same as taste or conditions require. I desire to be understood as claiming my improvements specifically in the form illustrated as well as broadly within the scope of the appended claims.

Having thus described my invention, what I claim is new and desire to secure by Letters Patent is:

1. In a fish bait or lure, the combination of a body; a socket member arranged in the rear end of the body, the edge of said socket member being flanged outwardly; a line attaching rod arranged longitudinally of the body and threaded into said socket whereby the socket is secured; tail tufts arranged in the flanged edge of said socket; fish hooks; and attaching screws for said hooks threaded into the bottom of said socket, the screws being disposed so that the rearward movement of the hooks is limited by the edge of the socket.

2. In a fish bait or lure, the combination of a body; a socket member arranged in the rear end of the body; a line attaching rod arranged longitudinally of the body and threaded into said socket whereby the socket is secured; tail tufts arranged in the edge of said socket; fish hooks; and attaching screws for said hooks threaded into the bottom of said socket, the screws being disposed so that the rearward movement of the hooks is limited by the edge of the socket.

3. In a fish bait or lure, the combination of a body; a socket member arranged in the rear end of the body; a line attaching rod arranged longitudinally of the body and threaded into said socket whereby the socket is secured; fish hooks; and attaching screws for said hooks threaded into the bottom of said socket, the screws being disposed so that the rearward movement of the hooks is limited by the edge of the socket.

4. In a fish bait or lure, the combination of a body; a socket member arranged in the rear end of the body; tail tufts arranged in the edge of said socket; facing fish hooks; and attaching screws for said hooks threaded into the bottom of said socket, the screws being disposed so that the rearward movement of the hooks is limited by the edge of the socket, said hooks being magnetized whereby they are normally held together within the tail.

5. In a fish bait or lure, the combination of a body; a socket member arranged in the rear end of the body; tail tufts arranged in the edge of said socket; facing fish hooks; and attaching screws for said hooks threaded into the bottom of said socket, the screws being disposed so that the rearward movement of the hooks is limited by the edge of the socket.

6. In a fish bait or lure, the combination of a body; a socket member arranged in the rear end of the body, the edge of said socket member being flanged outwardly; tail tufts arranged in the edge flange of said socket; and fish hooks secured in the bottom of said socket said hooks being magnetized whereby they are normally held together within the tail.

7. In a fish bait or lure, the combination of a body provided with a socket; and fish hooks secured in the bottom of said socket so that the rearward movement of the hooks is limited by the edge of the socket, said hooks being magnetized whereby they are normally held together.

8. In a fish bait or lure, the combination of a body provided with a socket, and fish hooks secured in the socket to permit their swinging forward past each other, the rearward movement of the hooks being limited by the edge of the socket, said hooks being supported in their normal position by magnetism.

In witness whereof I have hereunto set my hand and seal in the presence of two witnesses.

HENRY S. FAUGHT. [L. S.]

Witnesses:
LUELLA G. GREENFIELD,
ANNA FOOTE.